W. F. RIPPON.

Improvement in Dough-Rollers and Cutters.

No. 126,833. Patented May 14, 1872.

Witnesses:

William F. Rippon
per Brown Cumbert & Co
Attorneys

UNITED STATES PATENT OFFICE.

WILLIAM F. RIPPON, OF PROVIDENCE, RHODE ISLAND, ASSIGNOR TO HIMSELF AND EMORY COOK, OF SAME PLACE.

IMPROVEMENT IN DOUGH ROLLERS AND CUTTERS.

Specification forming part of Letters Patent No. 126,833, dated May 14, 1872.

Specification of a combined Dough Roller and Cutter or Pastry-Machine, invented by WILLIAM F. RIPPON, of Providence, in the county of Providence and State of Rhode Island.

This invention consists in the combination with each other, in a suitable frame, of a rolling-pin, a bar carrying cutters of suitable shape for cutting cakes or crackers, anti-friction rollers, which secure the frame to a table or board so as to permit its movement thereon, and a lever forming a handle, whereby a very efficient machine is produced for rolling and cutting dough or paste, and which is very simple of construction and consequently can be very cheaply manufactured.

Figure 1:
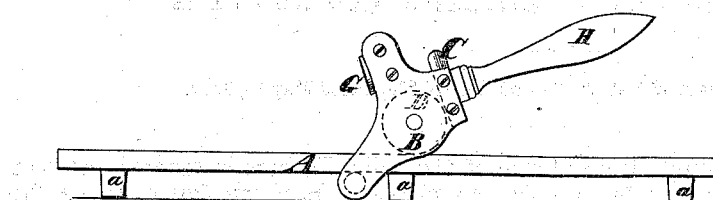
Figure 2:
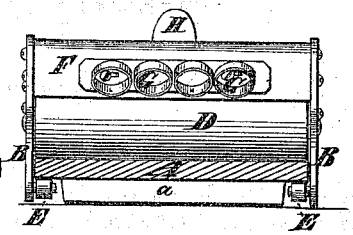
Figure 3:
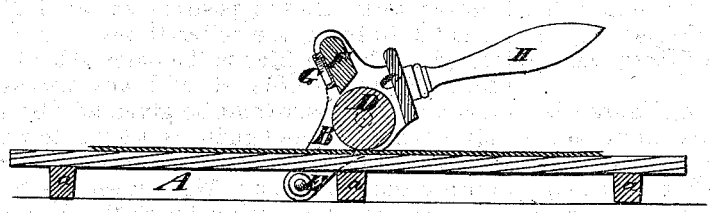
Figure 4:
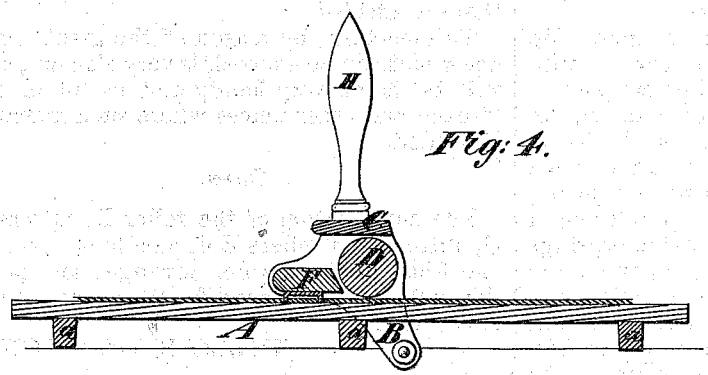

In the accompanying drawing, Figure 1 is a side view of a machine made according to my invention, showing it applied to a board. Fig. 2 is a front view of the same. Fig. 3 is a longitudinal section thereof, showing it as used for rolling dough, and Fig. 4 is another longitudinal section showing it as being used for cutting dough.

Similar letters of reference indicate corresponding parts in all the figures.

A is a board, which has on its under side cross-pieces or battens a a, which serve to raise the board from the table or other support on which it is used, but which, not extending quite to its side edges, permit rollers on the frame of the machine to run along its under side. B C is a frame, consisting of two end pieces, B B, and a cross-piece, C. D is the rolling-pin or dough-roller, which is supported in bearings in the end pieces B B of the frame, above the board A. To the lower portion of the end pieces, some distance from the aforesaid roller, there are pivoted to their inner sides anti-friction rollers E E, which, in the operation of the dough-roller, run along the under side of the edge-portion of the board A, and also serve to secure the machine to it. A little to one side of the roller D there is secured, between the end pieces B B of the frame, above the board A, a cross-bar, F, which has secured to its under side a series of cake or cracker cutters, G G, which are secured so as to be removable at pleasure to provide for the substitution of others of different shape or size. H is a lever-like handle, which is secured to the cross-piece C of the frame of the machine, and by which the machine is operated.

The dough to be rolled is placed on the board A, and the handle or lever H and frame thrown over into the position shown in Figs. 1 and 3, to bring the roller D down onto the dough. The machine is then moved back and forth by the handle H, and any necessary amount of pressure may be given to it by simply bearing on the handle as a lever, to which the anti-friction rollers E E form a fulcrum during this operation. When desirable to use the machine for cutting dough the handle is thrown over into such position that the faces of the cutters shall be parallel with the face of the board, as shown in Fig. 4; the handle is then pressed down and the cutting of the dough thereby effected.

This machine, by reason of the great leverage which can be exerted, is very efficient, and will be found very handy and useful in the kitchen and other places where such machine is needed.

Claim.

The combination of the roller D, cutters G G, anti-friction rollers E E, handle or lever H, and frame B C, the whole arranged for operation, substantially as and for the purpose herein set forth.

WILLIAM F. RIPPON.

Witnesses:
  JOHN B. BENSON,
  WILLIAM PICKLES.